No. 712,416. Patented Oct. 28, 1902.
F. H. RICHARDS.
PLAYING BALL.
(Application filed Aug. 5, 1902.)
(No Model.)
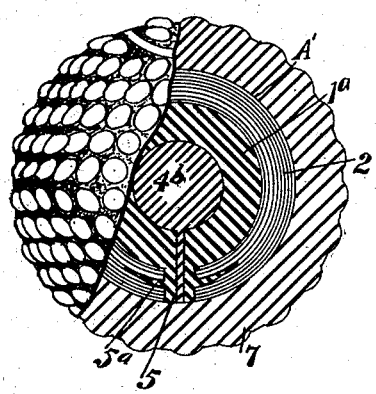
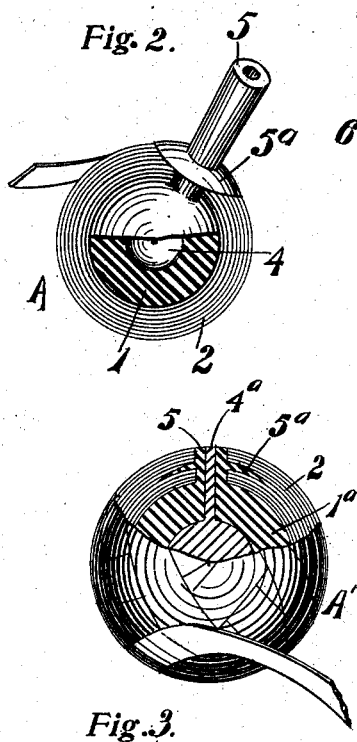
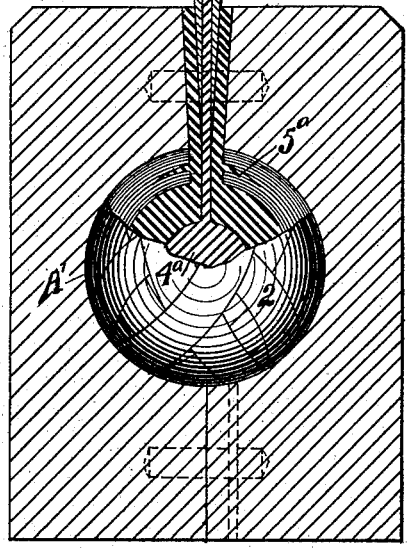
Witnesses:
J. E. Davidson.
Herbert J. Smith
Inventor:
F. H. Richards.

UNITED STATES PATENT OFFICE.

FRANCIS H. RICHARDS, OF HARTFORD, CONNECTICUT, ASSIGNOR TO THE KEMPSHALL MANUFACTURING COMPANY, OF ARLINGTON, NEW JERSEY, A CORPORATION OF NEW JERSEY.

PLAYING-BALL.

SPECIFICATION forming part of Letters Patent No. 712,416, dated October 28, 1902.

Application filed August 5, 1902. Serial No. 118,429. (No model.)

*To all whom it may concern:*

Be it known that I, FRANCIS H. RICHARDS, a citizen of the United States, residing at Hartford, in the county of Hartford and State of Connecticut, have invented certain new and useful Improvements in Playing-Balls, of which the following is a specification.

This invention relates to playing-balls, especially those used in golf; and its object is to furnish at low cost a durable ball which has great flying power, but is dead under a light blow.

In the drawings forming a part of this specification, Figure 1 is a sectional view of a complete ball made in accordance with my improvements. Fig. 2 is a view of the preferred form of rubber shell employed in the interior of the core, this view showing the shell in its normal or unexpanded condition and also showing the size of the sphere of tense windings thereon before the final injection of core material. Fig. 3 is a part-sectional view illustrating the preferred core or inner ball. Fig. 4 is a part-sectional view illustrating a stage in completing a core.

Throughout the views similar parts are designated by similar characters of reference.

Upon a shell 1 of solid rubber I wind continuously in different directions a strip 2 of rubber to form a core or inner ball A. I prefer to use acid-cured or surgeons' rubber in a wide strip and about one one-hundredth of an inch thick, which I wind in a state of high tension. Owing to the thinness of the windings and to the tension of the rubber I make a ball or core which is solid and consists of a multitude of thin layers tensioned in all directions. Before the rubber is wound on the hollow within the rubber shell 1 may be filled by a center piece 4, of gutta-percha or other material, which may be injected through a hollow stem 5, formed for convenience upon the shell 1. In some cases, however, a center piece 4 need not be provided before the winding on of the rubber.

Owing to its compactness, as well as to the tensioned condition of its layers, the core A is highly resilient under a heavy blow, this quality being increased by the presence of the soft mobile rubber sphere or layer 1 within the wound shell and being further increased by the presence of a hard center, as 4, within the soft rubber.

Before applying a shell to the core A, I prefer to inject softened or fluent material $4^a$ under pressure to an extent to expand both the rubber sphere 1 and also the layers comprising the wound shell, as illustrated at Fig. 4. The material $4^a$, which is preferably gutta-percha, may be injected while hot through a nozzle 6, inserted in the tubular stem 5, force being applied to the fluent gutta-percha by means of a piston $6^a$. The pressure may be made very high to the end not only to tension the rubber shell 1, and thereby increase its liveliness, but also to give an extra or final tension to the rubber windings, thus stretching them practically to the limit and compacting them into a solid or highly-compressed shell, which by reason partly of its solidity and partly on account of its longitudinal tension is extremely lively under a hard blow. Upon the core thus formed I apply under heat and pressure a shell 7, preferably of gutta-percha and preferably holding the core A under high compression. At the heating of the shell material the tensioned rubber layers are usually warmed and become adherent throughout.

It will be observed that owing partly to the mobility of the tensioned soft-rubber shell $1^a$ within the compressed wound sphere the latter may be slightly distorted by a blow, although owing to the solidity of said rubber shell $1^a$ and of the injected core $4^b$, as well as to the high tension of the wound layers, said expanded shell A' tends instantly upon being depressed to recover its normal shape. It is difficult to wind the rubber strips by hand with an even degree of tension, especially high tension; but by winding the rubber tight and then giving an extra or final tension by injecting core material a very high tension of the windings all over the ball is secured, with a corresponding increase in driving or flying quality. This feature of improvement may also be carried out in balls in which rubber threads are used in winding a sphere. It will be further understood that owing to the constant compression by the shell 7 of the depressible tensioned-rubber sphere A', with its solid mobile interior, the whole ball tends instantly to recover its spherical form upon being distorted by a blow, and hence the flying power of the ball is rendered phenomenal. It will also be understood that the compressed sphere A' is very hard and not much affected by a light blow and that the same is also true of the shell 7, so that for "putting" the ball is dead, and hence desirable for the same.

The hollow stem 5 is preferably provided with a flange or anchor 5ª, the strips of rubber being wound around the stem and also over the flange, whereby the tube is rendered stable at the operation of injecting core material.

Variations in construction and other particulars may be resorted to within the scope of my invention, and portions of my improvements may be used without others.

Having described my invention, I claim—

1. In a playing-ball, a plurality of shells, one consisting of a complete soft-rubber shell, and the other consisting of built-up layers, and both materially expanded by mobile material injected thereinto.

2. In a playing-ball, a plurality of shells, one consisting of a complete soft-rubber shell, and the other consisting of built-up layers, and both materially expanded by mobile material injected thereinto, and a cover of gutta-percha holding said shells under compression.

3. In a playing-ball, a sphere of rubber windings distended by mobile substance injected thereinto, and a hard cover, said rubber being in a state of compression between said injected substance and said cover, and a continuous layer of rubber intervening between said injected substance and said windings.

4. In a playing-ball, a sphere of rubber windings distended by gutta-percha injected thereinto, and a continuous layer of rubber intervening between said gutta-percha and said windings.

5. In a playing-ball, tight windings of rubber forming a substantial shell, said shell being distended by mobile material injected thereinto, and a hard cover upon said rubber, a continuous layer of rubber intervening between said mobile material and said windings.

6. In a playing-ball, tight windings of rubber forming a substantial shell, said shell being distended by mobile substance injected thereinto, and a hard cover holding said shell under compression, a continuous layer of springy material intervening between said windings and said mobile substance.

7. In a playing-ball, a sphere consisting of tight windings of sheet-rubber, said windings distended by mobile material injected thereinto, and a hard cover, a continuous layer of springy material intervening between said windings and said injected material.

8. In a playing-ball, a sphere consisting of tight windings of rubber, said sphere being compressed and said windings distended by mobile material injected thereinto, a layer of distended mobile material intervening between said rubber and said injected material, and a hard cover.

9. In a playing-ball, a cover of plastic material holding under compression an expanded layer of tense rubber windings, an expanded layer of solid rubber, and a hard central body.

10. In a playing-ball, a cover of gutta-percha holding under compression an expanded solid layer consisting of tight windings of rubber strip, an expanded layer of solid rubber, and a hard central body.

11. In a playing-ball, a shell consisting of tight windings of rubber strip, said shell being distended by plastic material injected thereinto, a tensioned layer of solid rubber intervening between said plastic material and said shell, and a cover of gutta-percha holding said shell under compression.

12. In a playing-ball, a plurality of rubber spheres, one within the other, said spheres being expanded by mobile material injected into the inner sphere, one of said spheres consisting of tense windings of rubber strip, and the other consisting of solid rubber.

13. In a playing-ball, a rubber sphere having a hollow stem, and tense windings of suitable material upon said sphere and around said stem, said sphere being distended by fluent material injected through said stem.

14. In a playing-ball, a rubber sphere having a hollow stem, a flange or projection upon said stem, and tense windings of suitable material upon said sphere and around said stem, and over said flange or projection, said sphere being distended by fluent materal injected through said stem.

FRANCIS H. RICHARDS.

Witnesses:
B. C. STICKNEY,
JOHN O. SEIFERT.